United States Patent

[11] 3,602,343

[72] Inventor Henry R. Billeter
 Deerfield, Ill.
[21] Appl. No. 866,803
[22] Filed Oct. 16, 1969
[45] Patented Aug. 31, 1971
[73] Assignee Sloan Valve Company
 Chicago, Ill.

[54] DOUBLE-ACTING SLACK ADJUSTERS
 14 Claims, 8 Drawing Figs.
[52] U.S. Cl. .................................................. 188/202,
 188/196 D
[51] Int. Cl. .................................................. F16d 65/66
[50] Field of Search .......................................... 188/196
 PR, 198, 203 PL

[56] References Cited
UNITED STATES PATENTS
3,512,619  5/1970  Rauglas ................... 188/196 (PRR) X Primary Examiner—Duane A. Reger
Attorney—Parker, Carter & Markey ABSTRACT: An automatic double-acting slack adjuster for railway cars has two spin nuts arranged on a threaded rod. The spin nuts are rotatable to take up or let out slack and have clutch surfaces engageable with clutch surfaces on a traction sleeve tube to stop the rotation. The spin nuts are normally clutched to prevent unintended relative movements under operating conditions of heavy vibration and shock.

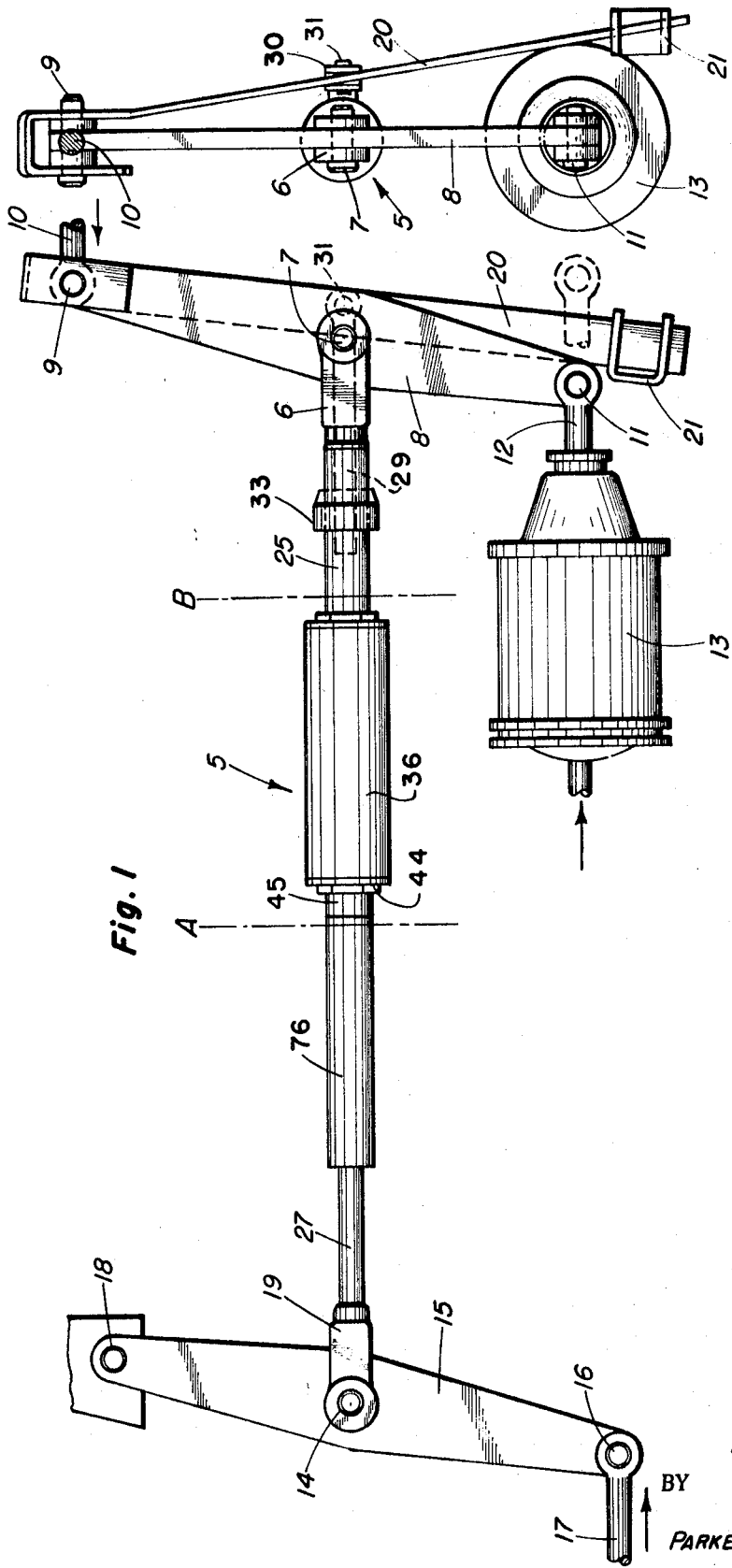

INVENTOR.
HENRY R. BILLETER
BY
PARKER, CARTER & MARKEY
ATTORNEYS

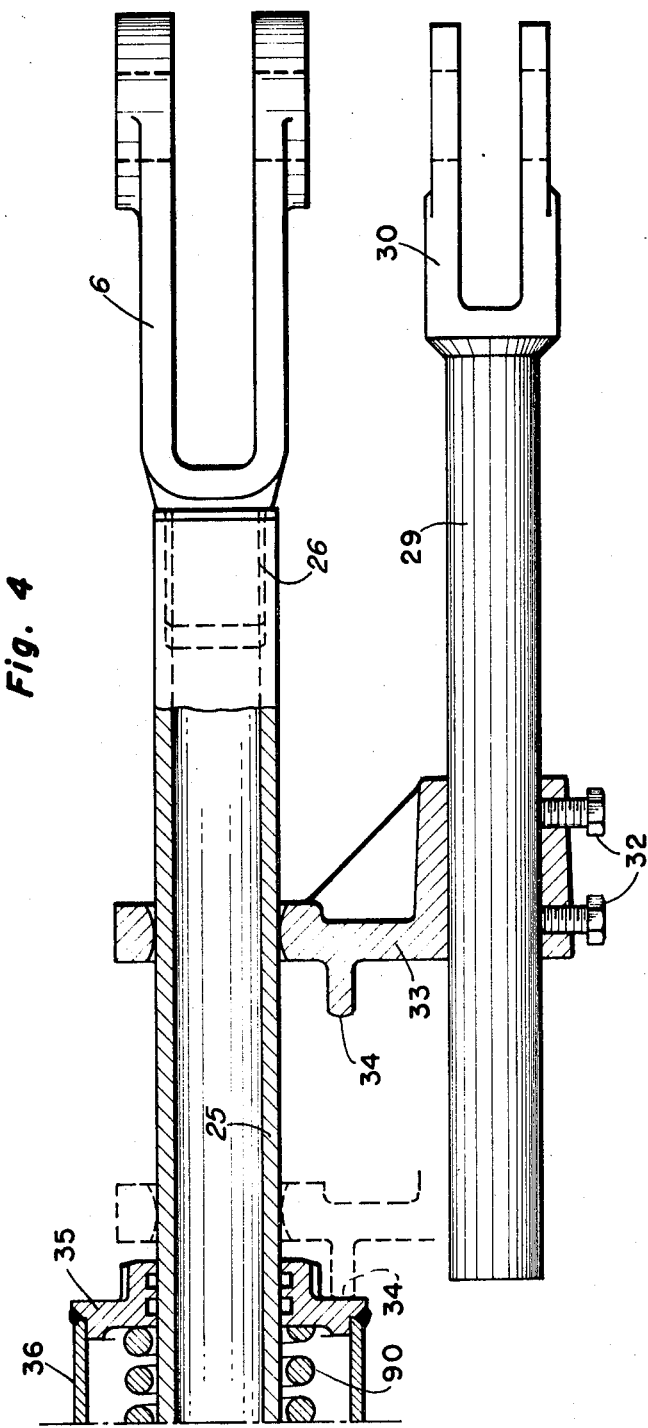
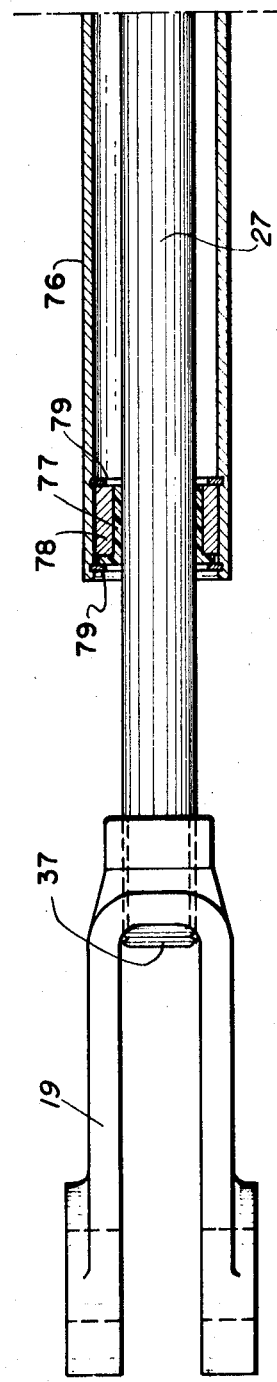

DOUBLE-ACTING SLACK ADJUSTERS

FIELD OF THE INVENTION

This invention is concerned with automatic double-acting slack adjusters for railway cars for either reducing or increasing the slack in the brake system in order to provide optimum brakeshoe clearance with the car wheels at all times. The slack adjuster uses fewer parts which are compactly constructed to fit in all types of installations on railway cars. The device is relatively simple, lightweight, and rugged in construction, with the operating parts protected from dirt and the weather.

Among the objects of the invention are means to prevent sagging or bowing of the slack adjuster at its midpoint due to vibration under train operation, so that the spin nuts will clutch evenly around their circumference with the opposed clutch surfaces; a locking arrangement between the trigger tube and the traction sleeve to permit rotation of these parts in all axial positions of the trigger tube; provisions for ease of assembly of the traction sleeve in the device; elimination of the main spring commonly used in slack adjusters; and importantly clutching arrangements between the spin nuts and traction sleeve to prevent false let out of the slack adjuster under severe operating conditions. Other objects and features will become apparent from the specification and drawings.

BRIEF DESCRIPTION OF THE DRAWINGS

FIG. 1 is a plan view illustrating a typical brake rigging arrangement of a railway car together with the slack adjuster of the invention;

FIG. 2 is an end view from the right-hand side of FIG. 1;

FIG. 4 is a sectional view of the right-hand end of the slack adjuster;

FIG. 5 is a sectional view of the left-hand end of the device; and

FIG. 7 is a modification of the invention; while

Figure 3:
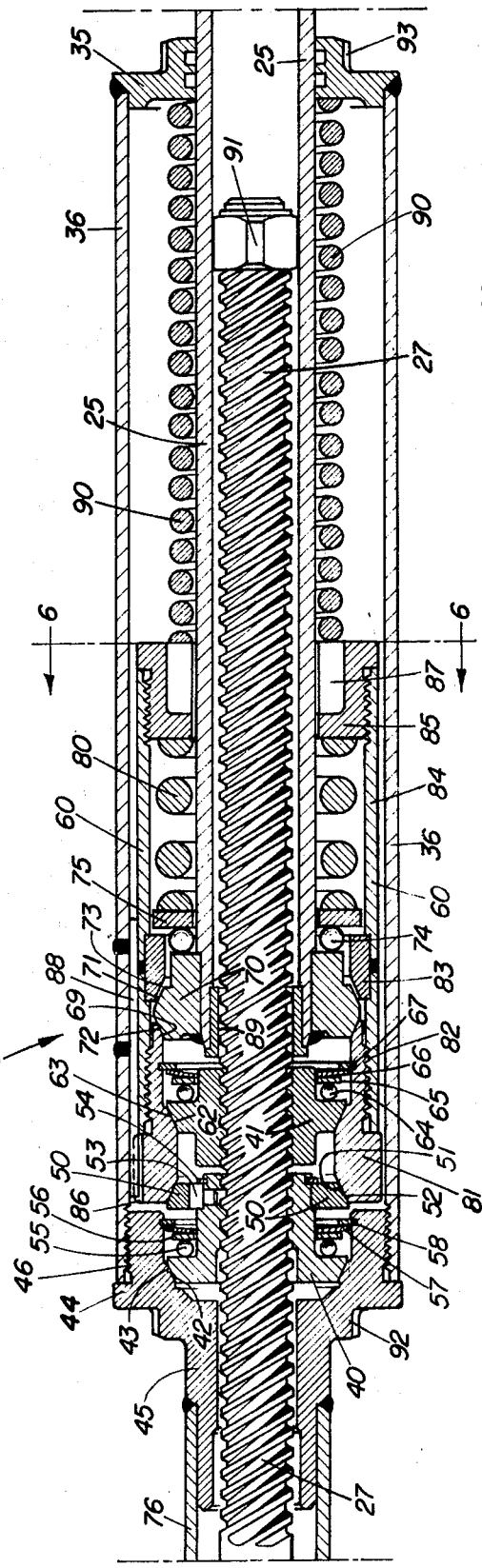
FIG. 3 is an enlarged cross-sectional view of the center portion of the slack adjuster taken between the points A and B of FIG. 1.

The improved automatic double-acting slack adjuster of the present invention is adapted for installation in the brake rigging of a railway car in the usual position between the brake cylinder and brakeshoes and specifically as a center rod connection between the live lever and the dead lever as shown in FIG. 1. When so installed the slack adjuster will automatically take up excess slack due to brakeshoe and rigging wear, and let out slack when new brake shoes are installed, in order to maintain the travel of the brake cylinder pushrod within the limits prescribed by railroad practice regulations. The slack adjuster is adapted to take up slack to at least 19 inches if necessary.

DETAILED DESCRIPTION OF THE SLACK ADJUSTER

The slack adjuster indicated generally at 5, comprises a unitary structure including a dirt and dustproof casing or housing connected at the right-hand end by the jaw or clevis 6 and pivot pin 7 to the center portion of live lever 8. The upper end of live lever 8 has a pivot pin 9 for connection with a portion of the brake rigging 10 leading to the brakeshoes (not shown) in the customary manner. The bottom end of live lever 8 is pivoted by pin 11 to the end of pushrod 12 of the brake cylinder 13, which has a movable piston therein responsive to the usual brake control device of the railway car upon a brake application. The left-hand end of the slack adjuster 5 is provided with a supporting jaw or clevis 19 pivoted by pin 14 to the midportion of dead lever 15. This dead lever 15 in turn is pivoted by pin 16 at its lower end to another portion 17 of the brake rigging leading to the brakeshoes on another truck of the railway car. At its upper end the dead lever 15 is pivoted at 18 to a fixed part of the frame of the railway car. Additionally, adjacent to live lever 8 (FIG. 2) there is an actuating lever 20 also pivoted at its upper end by pin 9 and having its lower end loosely slidable and pivoted in a slot formed in a bracket 21 supported on the railway car frame.

The general arrangement of the foregoing elements is well known and is such that outward projection of the pushrod 12 by operation of the brake cylinder 13 results in the pivoted movement of levers 8 and 15 together with the axial movement of the slack adjuster 5, so that braking force is applied to the linkages 10 and 17 in the direction indicated, to produce an application of the brakes.

The slack adjuster 5 is preferably made up of a series of elongated hollow tubes or housings all suitably joined together as by welding or threading into a single unitary structure for the entire length of the device so that the internal operating elements are all protected and enclosed from damage by the weather, flying stones and other possible adverse effects. The slack adjuster illustrated in FIG. 3 shows the parts in the normal running position with the brakes in the off position. A tubular pull rod 25 is arranged within the device for longitudinal movement and has its right-hand end extending outward for threaded connection at 26 with the jaw 6. A threaded rod 27 is telescopically and axially disposed within the pull rod tube 25 for longitudinal shifting movement relative to the tube, and for a substantial portion of its length is provided with nonself-locking threads having a helix angle upon which a pair of spin nuts are adapted to be rotated, as will be pointed out hereinafter.

A trigger arrangement for sensing excess slack is controlled by actuating lever 20 and includes a trigger rod 29 alongside the slack adjuster body having at one end a clevis 30 secured by pivot pin 31 to the approximate midpoint of the actuating lever 20. The trigger rod 29 is clamped by locking screws 32 to a slidable bracket 33 loosely surrounding the pull rod tube 25. An abutment 34 on bracket 33, under certain conditions is adapted to engage a collar 35 suitable secured on the right-hand end of a trigger tube housing 36. The collar 35 surrounds and is in sliding and sealing engagement with the pull rod tube 25. The trigger bracket 33 and its abutment 34 are normally spaced from the collar 35 and the collar is adapted, when contacted by abutment 34, to shift the trigger tube 36 to the left after the pushrod 12 has been extended a distance of between 7 to 9 inches, indicating excess slack, as will be pointed out. The locking screws 32 enable the trigger rod 29 to be adjusted the proper amount in accordance with the particular installation, while the relative looseness of the bracket 33 around the pull rod tube 25 prevents binding of the parts due to slight misalignment that may be present in the installation. A further rough adjustment to properly position the slack adjuster 5 between the live lever 8 and dead lever 15, is provided by the screw-threaded connection 37 with the clevis 19 at the left-hand end of threaded rod 27.

In screw-threaded engagement with the rod 27, there are two annular spin nuts consisting of a feed nut 40 and a coupling nut 41. These spin nuts under certain conditions are free to rotate upon the threaded rod 27 to either take up or let out slack. The feed nut 40 has a clutching surface 42 normally arranged in cooperative clutching engagement with a clutching surface 43 formed in the housing part 44. This housing 44 has a shank portion 45 which surrounds a portion of the threaded rod 27 and thereby serves as a guide and bearing for the rod at that point. The outer annular portion of the housing 44 is threaded at 46 into the left end of the trigger tube 36. The shank portion of the feed nut 40 has a rear flange 50 on it provided with a clutching surface 51 normally engageable with a clutching surface 52 formed on the left-hand end of an elongated traction sleeve generally indicated at 60. The flange 50 is securely attached to the rear end of the shank of feed nut 40 by means of a locking screw 53 and a snap ring 54. Behind the feed nut 40 there is a thrust bearing 55 with its supporting washer 56, both being spring presses against the rear side of spin nut 40 by the bowed spring washer 57. The outer edge of bowed washer 57 is supported by the snap ring 58 recessed in the housing 44.

Referring to coupling spin nut 41, this has an annular clutch surface 62 engageable with clutch surface 63 formed in the traction sleeve 60. A suitable thrust bearing 64 and support washer 65 are provided for this spin nut together with a bowed spring washer 66 for normally urging the clutch surfaces 62 and 63 together. A snap ring 67 supports the outer edge of bowed washer 66 in a recess in the traction sleeve 60. The left-hand end of tubular pull rod 25 has an annular clutching flange or bushing 70 rigidly attached thereto as by welding. This flange 70 has two oppositely disposed clutch surfaces 69 and 71 formed around its periphery engageable with clutch surfaces 72 and 73 respectively, formed in traction sleeve 60. At the rear side of clutching flange 70 a thrust bearing 74 is provided together with bearing washer 75.

One end of a let-out spring 80 surrounding pull rod 25, bears against the bearing washer 75 and controls one portion of the clutching flange 70. The traction sleeve 60, containing the opposed clutching surfaces with which the spin nuts 40, 41 and the clutching flange 70 cooperate, consists of a number of separate sleeve members and annular tubular parts 81, 82, 83, 84 and 85 all suitably connected together as by threading or by welding as shown, with the object in view of facilitating assembly of the traction sleeve 60 as well as the other elements surrounding the threaded rod 27 and pull rod tube 25. The sleeve element part 81 includes the clutch surfaces 52, 63, and 72, while sleeve element 83 contains clutch surface 73.

Figure 6:
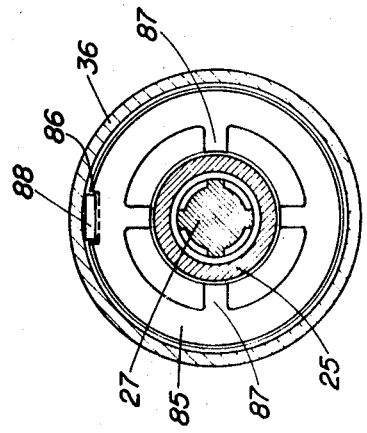
FIG. 6 is a cross-sectional view taken along the line 6—6 of FIG. 1.

The slack adjuster is provided with a takeup trigger spring 90 around the pull rod tube 25 which has one end abutting the collar 35 on the right-hand end of trigger tube 36, while the left-hand end of the spring 90 abuts the right-hand side of traction sleeve part 85 to normally urge the traction sleeve 60 in the normal position as illustrated. The sleeve 85 against which the spring 90 bears has internal flutes 87, as shown in FIG. 6, to enable a tool to be inserted in the sleeve to thread and assemble the same on the other sleeve part 84. The left-hand outer edge of the traction sleeve pat 81 has a horizontal slot 86 formed in it within which a long narrow key 88 is horizontally slidable. This key 88 is welded to the inside of the trigger tube 36 and may be slightly curved to fit the contour of this tube. The key 88 permits relative longitudinal movement between trigger tube 36 and traction sleeve 60 while insuring that these parts will rotate together. At the left-hand end of the pull rod tube 25 and located between its internal diameter and the outer surface of the threaded rod 27, there is a bushing 89 for guiding the relative longitudinal movements of pull rod 25 and threaded rod 27. This bushing 89 also serves to prevent a sag or distortion of the slack adjuster due to its length, it being unsupported otherwise at its midpoint. The spin nuts will therefore accurately engage with their clutch surfaces all around their periphery and not be "cocked" or twisted from their rotary positions to cause possible false operation.

At the extreme right-hand end of the threaded rod 27 there is firmly secured a guiding bushing 91 which serves as a stop to prevent pullout of rod 27. It is made hex-shaped so that in the assembly of the device, which is preferably packed with a lubricant, the lubricant can pass from one side to the other of the bushing 91.

At the left-hand end of the slack adjuster a guide sleeve 76 and enclosure is suitably welded to the end of the shank 45 of the end bushing 44. This sleeve 76 also supports a bearing 77 and bushing 78 around the bearing, both the latter being confined by a snap rings such as 79 recessed in sleeve 76 on both sides of the bearing. The bearing 77 serves to exclude dirt and moisture from entering the internal mechanism of the slack adjuster as the rod 27 is pulled inward or outward at each brake application.

In order to facilitate the assembly of the left-end end bushing or housing 44 on the end of the trigger tube 36, by threads 46 a series of wrench flats 92 on bushing 44 and 93 on bushing 35, are provided.

Figure 8:
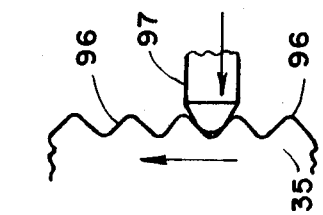
FIG. 8 is an enlarged diagrammatic side view of FIG. 7.
Figure 7:
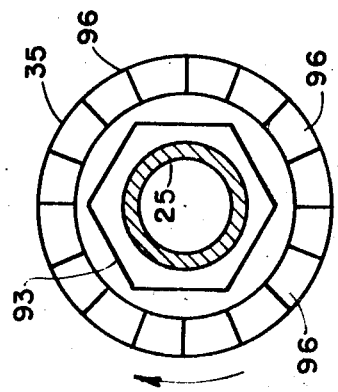

Referring to the modification shown in FIGS. 7 and 8, this shows the trigger collar 35 provided with a series of raised and shallow serrations 96 around its edge surface which are contacted by the trigger abutment 97 to stop the rotation of the trigger tube 36. This may provide in some applications a more reliable stopping means for the trigger tube 36 from that shown in FIG. 3 where a sliding frictional contact is depended upon to stop the rotation. The shape of the abutment 97 is such that when it engages one of the serrations 96 a positive stop to the rotation of the trigger tube 36 is insured.

DESCRIPTION OF THE OPERATION

For reasons well understood in the art, the maximum stroke of the brake cylinder pushrod 12 in response to a braking operation cannot exceed 12 inches, and an optimum range of 7 inches is selected for the slack adjuster to make its automatic adjustment for abnormal slack conditions which may be present in the brake rigging linkage or brakeshoes. When a brake application is made the pushrod 12 is forced outward by air pressure in the brake cylinder 13, thereby activating the live lever 8. The upper end of the trigger lever 20 is pivoted at pin 9 and the lower end of the trigger lever is slidably restrained by the bracket 21, so that the levers 8 and 20 will separate angularly at their lower ends. The slack adjuster being pivoted at one end to the center of live lever 8 at pivot 7, this angular separation movement of both levers will cause the midpoint of trigger lever 20 to shift the clevis 34 and its rod 33 inward or to the left. This movement is so calculated that the lower end of live lever 8 will be operated by the pushrod 12 over a distance of between 7 to 8 inches before the trigger bracket 34 engages the collar 35 on the trigger tube 36.

In the normal running condition of the railway car the slack adjuster parts are positioned as shown in FIGS. 1 and 3; that is, the slack adjuster is slightly stretched out between the live and dead levers, and the let-out spring 80 slightly compressed. This places the right-hand end of the threaded rod 27 somewhere to the left in the pull rod tube 25.

When a brake application under normal slack conditions takes place, the pull rod tube 25 will tend to move out of the trigger tube housing 36 toward the right, and at the same time the threaded rod 27 will move to the left, so as to create tension in the slack adjuster. The let-out spring 80, which has about 1,200 lbs. of applied force, will hold the parts in the position shown until such time as about 10 lbs. of air pressure are applied to the brake cylinder 13 and this force in turn to the system. The path of force is from the pull rod tube 25 to the let-out clutch 70, through spring 80, traction sleeve 60, clutch surfaces 62–63, to the coupling nut 41, and then to the threaded rod 27. After the force of the spring 80 has been overcome, the frictional contact between clutch surfaces 69 and 72 on the let-out clutch 70 and the traction sleeve 60, is reduced to the effect that traction sleeve 60 and its keyed housing 36, coupling nut 41 together with the feed nut 40, will all rotate on the threaded rod 27 to let out slack. This will add only a slight amount of slack into the system because as soon as trigger abutment 34 engages the friction surface on collar 35 at the end of the trigger housing 36, further rotation of the trigger housing will be stopped and thus no more slack will be let out. The continued force applied from the brake cylinder will further compress the let-out spring 80 so that let-out clutch 70 will then move over into contact with clutch surface 73 and thus provide a solid lock to the traction sleeve 60. The slack adjuster is now fully locked up and the brakes are firmly applied to the car wheels through the linkage.

Upon release of the brakes the let-out spring 80 will move the let-out clutch 70 away from the clutch surface 73 and traction sleeve 60, toward the left side of the traction sleeve and toward clutch surface 72. As the let-out clutch 70 moves to the left, there will be no rotation of the trigger housing 36 since under normal conditions abutment 34 is still applying pressure to housing 36. It is important to note that the traction sleeve 60 together with the trigger tube 36, rotates in one direction and that direction only lets out the slack. The traction sleeve 60 and trigger tube 36 however, do not rotate during slack takeup, as will be pointed out hereinafter.

When there is a brake application in which excess slack is present in the system, the normal small amount of slack let out does not take place because the trigger abutment 34 engages the trigger tube 36 before the air pressure has reached 10 lbs. in the brake cylinder 13 which pressure is necessary to overcome the let-out spring 80.

The pressure applied to the housing 36 by the abutment 34 will compress trigger spring 90 as brake pressure continues to be applied. Even after the force of spring 80 has been overcome and the let-out clutch 70 has moved from clutch surface 72 to clutch surface 73 the force from abutment 34 will continue to compress spring 90. Normally trigger spring 90 will bias the housing 36 to the right and thus apply pressure to spin nut 40 through mating clutch surfaces 42 and 43. Since the force of this spring has now been overcome by the pressure applied through abutment 34, spin nut 40 is free to spin on threaded rod 27. Thus, spin nut 40 will move to the left a distance related to the excess slack in the system, which distance is sensed by the length of time pressure is applied by the abutment 34 to housing 36 and trigger spring 90. When the slack adjuster is fully locked up and brakes are completely applied, spin nuts 40 and 41 will be separated. The housing 36 will not have rotated because of the pressure applied by abutment 34.

When the brakes are released trigger abutment 34 will remain against the friction surface of collar 35, compressing trigger spring 90. This force will axially move traction sleeve 60 to the left and cause nut 41 to rotate on the threaded rod 27 toward spin nut 40. The pull rod tube 25 will move into the trigger housing 36, in effect, the entire slack adjuster contracts. The coupling nut 41 continues to rotate on the threaded rod 27 so that the coupling nut 41 and the feed nut 40 will ultimately, assuming all the slack could be taken up in one application, come back to the original normal position. If the slack is not all taken up in one brake application after release of the brakes, the coupling nut 41 and the feed nut 40 may still be separated on the threaded rod 27. However, the remaining slack would then be taken up on the next brake application.

Assume a condition in which the brakes are too tight, as when new brakeshoes are installed, so that it is necessary to let out slack. The initial operation is as previously described in a normal brake operation. However, the trigger abutment 34 in this case does not contact the friction surface on collar 35 as soon as it would during normal operation. Due to this, as soon as the air pressure force by the brake cylinder has overcome the let-out spring 80, there will be rotation of the trigger housing 36 together with the coupling nut 41 and the feed nut 40 and this rotation will continue until such time as the trigger 34 finally contacts the friction surface on collar 35. During the rotation of the housing the pull rod tube 25 will move to the right while the threaded rod 27 will move to the left to separate the threaded rod and the housing. The brake release will be the same as described before.

The problem of sudden shocks in train operation such as vibration, heavy coupling load, etc., would tend to place the slack adjuster in tension and this would be identical with an axial force applied to the slack adjuster. However, the 1,200 lb. let out in spring 80 would hold the parts locked up in their normal brakes released condition. If the shocks would attempt to compress the slack adjuster endwise, the 150 lb. force of the trigger spring 90 tends to place the load on clutch surfaces 42–43 and 51–52. The purpose of clutch surfaces 51–52 is to prevent the threaded rod 27 from being pushed into the housing during a compressive type of vibration or sudden shock. Inward movement of the pull rod tube 25 is prevented by the clutching surfaces 69–72, so the combination of these clutch surfaces and the force of the trigger spring 90 prevents any collapsing of the slack adjuster due to a compressive-type load.

The guide bushing 89 around the threaded rod 27 and at the end of the pull rod tube 25, prevents the whole slack adjuster from sagging in the middle. This bushing 89 also prevents the spin nuts 40 and 41 from being tilted or cocked from their full frictional contact around the clutching surfaces with the traction sleeve 60.

The bushing 89 performs another function and that is to prevent the slack adjuster from coming apart. There is a second bushing 91 on the right-hand end of the threaded rod 27 arranged so that in the event the threaded rod 27 is pulled out to its full length from the slack adjuster, the bushing 91 will engage the bushing 89 and cause it to slide into contact with the coupling nut 41 and thereby apply a firm force through the coupling nut 41, back to the let-out spring 80 which would be compressed, and cause the slack adjuster to lock up rigid.

An important problem to overcome in previous slack adjusters was false takeup because of binding of the trigger rod. In the present invention no false takeup can occur since it is fail-safe. The only time there is slack takeup is when there is force applied from the trigger abutment 34. The only slack takeup is that brought about by compression of the trigger spring 90. In other words, if the trigger abutment 34 has moved the housing in, for example, half an inch, that is the amount of slack which is taken up. Accordingly the device never takes up more slack than is actually required by the position of the trigger 34.

An average in the present slack adjuster is the ease of installation. The threaded rod 27 can be manually rotated and move in and out of the housing to properly adjust the length for any particular installation. This is because of the elimination of the usual mainspring. In previous types of slack adjusters the mainspring could not be adjusted to provide for the effective length of the slack adjuster without the use of a wrench or some other tool.

Another principal advantage, in addition to the simple assembly, is the ease of machining the various parts such as the tubes, spin nuts, etc., which are simple and inexpensive to produce. There are also fewer parts employed than in previous slack adjusters.

I claim:

1. In an automatic slack adjuster for railway car brakes, a pull rod tube having its outer end connected to one portion of the brake system, a threaded rod extending within said pull rod tube connected at its outer end to another portion of the brake system, a feed nut and a coupling nut on said threaded rod, both located adjacent the inner end of said pull rod tube, said nuts adapted to spin on said threaded rod, a let-out flange secured to the inner end of said pull rod tube, said coupling nut being located between said feed nut and said let-out flange, a traction sleeve surrounding said spin nuts and said let-out flange, a trigger tube surrounding said traction sleeve, a spider bushing secured to one end of said traction sleeve and in slidable contact with said pull rod tube, a trigger spring surrounding said pull rod tube and extending between one side of said spider bushing and one end of said trigger tube, a let-out spring surrounding said pull rod tube and extending between the other side of said spider bushing and said let-out flange, bearings for each of said spin nuts and said let-out flange, said feed nut having two clutch surfaces thereon, one clutch surface normally engaging a clutch surface on said trigger tube and the other clutch surface engaging a clutch surface on said traction sleeve, said coupling nut having a clutch surface engaging a clutch surface on said traction sleeve, said let-out flange having clutch surfaces positioned to engage opposed clutch surfaces on said traction sleeve, separate spring means urging the clutching surfaces of said feed nut and said coupling nut into engagement with the clutching surfaces of said trigger tube and traction sleeve, and keyway means between said traction sleeve and said trigger tube to permit relative sliding longitudinal movement therebetween while locking the same together upon rotary motion.

2. In an automatic slack adjuster for railway car brakes, a pull rod connected to one portion of the brake system and a threaded rod inside said pull rod tube connected to another portion, a feed nut and a coupling nut arranged for spinning movement on said threaded rod to let out or take up slack, a let-out flange secured to the inner end of said pull rod tube, said coupling nut being located between said feed nut and said let-out flange, a traction sleeve surrounding said spin nuts and said let-out flange, cooperating opposed clutch surfaces between said spin nuts and said traction tube and others between said feed nut and said trigger tube, spring means urging said spin nuts and let out flange into operative engagement with the associated clutch surfaces, a trigger spring arranged between the end of said trigger tube and one end of said traction sleeve, a let-out spring arranged between the said one end of said traction sleeve and said let-out flange, means responsive to slack conditions in said brake system for causing said spin nuts to revolve on said threaded rod to compensate for said conditions, means coupling said trigger tube to said traction sleeve to permit rotation of said trigger tube and said traction sleeve together with said spin nuts, said coupling means arranged to permit relative longitudinal movement between said trigger tube and said traction sleeve while locked together for rotary movement.

3. In a automatic adjuster for railway car brakes, a pull rod tube connected to one portion of the braking system, a threaded rod arranged telescopically within said pull rod tube and connected to another portion of said brake system, a feed nut and a coupling nut arranged for spinning movement on said threaded rod and adapted to take up or let out slack, a let-out flange secured to the inner end of said pull rod tube, a traction sleeve around said spin nuts and said let-out flange, a trigger tube around said traction sleeve and said pull rod tube, separate cooperating clutching surfaces between said feed nut and said trigger tube, and between said feed nut and said traction sleeve, cooperating clutching surfaces between said coupling nut and said traction sleeve, and two separate cooperating clutching surfaces between said let-out flange and said traction sleeve, a spider bushing on the end of said traction sleeve and around said pull rod tube, a let-out spring around said pull rod tube and extending between said spider bushing and said let-out flange, a trigger spring around said pull rod tube and extending between said spider bushing and one end of said trigger tube, spring pressed bearings on each of said spin nuts normally urging said spin nuts into engagement with their clutching surfaces, cooperative key and slot elements between said traction sleeve and said trigger tube whereby said traction sleeve and trigger tube are adapted to shift laterly with respect to one another and to rotate axially together as a unit.

4. The slack adjuster arrangement as claimed in claim 3 in which a guide bushing is loosely supported on the end of said pull rod tube and around said threaded rod, said guide bushing also being located adjacent said let-out flange and serving to guide said threaded rod, said guide bushing preventing said slack adjuster from sagging at its midpoint and thereby maintaining said spin nuts and said let-out flange in normal contact engagement with their respective clutching surfaces all around their edges.

5. The slack adjuster arrangement as claimed in claim 4 in which the end of the threaded rod is provided with a stop bushing adapted to engage said loose guide bushing and prevent complete withdrawal of said threaded rod from said slack adjuster.

6. The slack adjuster as claimed in claim 5 in which the loose guide bushing is arranged to slide and engage said coupling nut to lock up the slack adjuster when an attempt is made to pull the threaded rod out of the slack adjuster.

7. The slack adjuster arrangement as claimed in claim 5 in which the stop bushing is hex-shaped to enable a lubricant to pass from one side of said stop bushing to the other upon assembly of the slack adjuster.

8. The slack adjuster arrangement as claimed in claim 3 in which the key and slot arrangement between said trigger tube and said traction sleeve comprises a longitudinal slot formed in a section of the outer surface of said traction sleeve, and a key element in said slot supported on the inner surface of said trigger tube, said key element being longer than the slot.

9. The slack adjuster as claimed in claim 3 in which the spider bushing is arranged with flutes on one side against which the trigger spring bears, said spider bushing being threaded into the end of said traction sleeve to facilitate assembly of said slack adjuster.

10. The slack adjuster as claimed in claim 3 in which the end of said trigger tube is provided with a collar through which said pull rod tube slides in sealing engagement, the collar having a series of ridges formed on its outer side adapted to be engaged by a trigger means to shift the trigger tube axially under certain slack conditions and to stop rotation of the trigger tube under other slack conditions.

11. In a automatic slack adjuster for railway car brakes, a housing, one end of which is positioned for contact by a portion of the railway car brake rigging during application of the brakes, a threaded rod and hollow tube telescopically movable within the housing and adapted to be connected at their outer ends to the brake system, a pair of spin nuts on said threaded rod adjacent the inner end of said tube, a clutch member fastened to said tube at its inner end, a traction sleeve within the housing and having clutch surfaces engaging mating clutch surfaces on both of said spin nuts and said clutch member, a slack takeup spring positioned between said housing and said traction sleeve, and a slack let-out spring positioned between the traction sleeve and said clutch member.

12. The structure of claim 11 further characterized in that one of said spin nuts has a pair of clutch surfaces, one mating with a clutch surface on the housing and the other mating with a clutch surface on the traction sleeve.

13. The structure of claim 12 further characterized in that the other of said spin nuts has a clutch surface mating with a clutch surface on said traction sleeve, and spring means urging said clutch surfaces toward each other.

14. The structure of claim 12 further characterized in that said clutch member has a pair of oppositely directed and adjacent clutch surfaces positioned to engage with oppositely directed clutch surfaces on said traction sleeve.